United States Patent
Singamshetty et al.

(10) Patent No.: US 9,576,026 B2
(45) Date of Patent: Feb. 21, 2017

(54) SYSTEM AND METHOD FOR DISTRIBUTED SQL JOIN PROCESSING IN SHARED-NOTHING RELATIONAL DATABASE CLUSTERS USING SELF DIRECTED DATA STREAMS

(71) Applicant: FutureWei Technologies, Inc., Plano, TX (US)

(72) Inventors: Mohan Singamshetty, Sunnyvale, CA (US); Yang Sun, Palo Alto, CA (US); Qingqing Zhou, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 346 days.

(21) Appl. No.: 13/802,023

(22) Filed: Mar. 13, 2013

(65) Prior Publication Data

US 2014/0280020 A1    Sep. 18, 2014

(51) Int. Cl.
*G06F 17/30* (2006.01)

(52) U.S. Cl.
CPC .............................. *G06F 17/30445* (2013.01)

(58) Field of Classification Search
CPC ............. G06F 17/30442; G06F 17/30445; G06F 17/30595; G06F 17/30477; G06F 17/30578; G06F 17/30418; G06F 17/30448; G06F 17/30536; G06F 17/30554; G06F 17/30483; G06F 17/30463; G06F 17/30454; G06F 17/30584
USPC ................................................. 707/714, 713
See application file for complete search history.

(56) References Cited

U.S. PATENT DOCUMENTS

| | | | |
|---|---|---|---|
| 5,873,075 | A | 2/1999 | Cochrane et al. |
| 6,081,801 | A | 6/2000 | Cochrane et al. |
| 6,092,062 | A | 7/2000 | Lohman et al. |
| 2009/0198703 | A1* | 8/2009 | Ezzat et al. ................. 707/10 |
| 2013/0311444 | A1* | 11/2013 | Samwel et al. ............. 707/714 |

FOREIGN PATENT DOCUMENTS

| | | |
|---|---|---|
| CN | 1588358 A | 3/2005 |
| CN | 102521307 A | 6/2012 |

OTHER PUBLICATIONS

International Search Report recieved in PCT/CN2014/073378, mailed Jul. 8, 2014, 12 pages.

\* cited by examiner

*Primary Examiner* — James Trujillo
*Assistant Examiner* — Fariborz Khoshnoodi
(74) *Attorney, Agent, or Firm* — Slater Matsil, LLP

(57) ABSTRACT

System and method embodiments are provided for improving the performance of query processing in a massively parallel processing (MPP) database system by pushing down join query processing to data nodes recursively. An embodiment method includes receiving, at a coordinator process, a join query associated with a plurality of tables of the MPP database system, generating, at the coordinator process, an execution plan tree for the join query, and processing, at each of a plurality of data nodes communicating with the coordinator process, the execution plan tree to obtain join query results. The method further includes, upon detecting a next join operator below a top join operator in the execution plan tree at each of the data nodes, forwarding to the other data nodes a sub-tree for the next join operator, and receiving, at each of the data nodes from the other data nodes, sub-tree processing results.

20 Claims, 5 Drawing Sheets

SYSTEM AND METHOD FOR DISTRIBUTED SQL JOIN PROCESSING IN SHARED-NOTHING RELATIONAL DATABASE CLUSTERS USING SELF DIRECTED DATA STREAMS

TECHNICAL FIELD

The present invention relates to database processing and computing, and, in particular embodiments, to a system and method for distributed SQL join processing in shared-nothing relational database clusters using stationary tables.

BACKGROUND

A massively parallel processing (MPP) database system allows a database administrator to create a database and distribute its data to a number of processors, called partitions or data nodes. The concept of MPP is the coordinated processing of a program by multiple processors, with each processer working on different parts of the program. The processors communicate with one another to complete a task, with each of them using its own operating system and memory resources. There is usually at least one process that serves clients of the MPP database system, called coordinator. A Structured Query Language (SQL) join query issued against such a database is handled by the coordinator that selects data tables to fulfill the join query and sends this information to each data node for execution.

SUMMARY OF THE INVENTION

In accordance with an embodiment, a method for query processing in a massively parallel processing (MPP) database system includes receiving, at a coordinator process, a join query associated with a plurality of tables of the MPP database system, generating, at the coordinator process, an execution plan tree for the join query, and processing, at each of a plurality of data nodes communicating with the coordinator process, the execution plan tree to obtain join query results. The method further includes, upon detecting a next join operator below a top join operator in the execution plan tree at each of the data nodes, forwarding to the other data nodes a sub-tree for the next join operator, and receiving, at each of the data nodes from the other data nodes, sub-tree processing results.

In accordance with another embodiment, a method for query processing in a MPP database system includes receiving, at a data node from one or more other data nodes, a sub-tree of an execution plan tree for a join query associated with a plurality of tables of the MPP database system, the sub-tree corresponds to a next join operator below a top join operator in the execution plan tree, processing the sub-tree using partitions of the tables allocated to the data node, and returning sub-tree processing results to the one or more other data nodes.

In accordance with yet another embodiment, an apparatus for query processing in a MPP database system includes a plurality of data nodes, each comprising a processor and a computer readable storage medium storing programming for execution by the processor. The programming includes instructions to receive, at a data node from a coordinator process, an execution plan tree for a join query associated with a plurality of tables of the MPP database system, and process the execution plan tree to obtain join query results using partitions of the data tables allocated to the data node without other partitions of the data tables allocated to the other data nodes. The programming includes further instructions to, upon detecting a next join operator below a top join operator in the execution plan tree, forward a sub-tree for the next join operator to the other data nodes, receive sub-tree processing results from the other data nodes, and return to the coordinator process the join query results including the sub-tree processing results.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A MPP database system is based on shared-nothing architecture, where data tables are divided into partitions and distributed to different processing nodes. Each partition is assigned to one processing node exclusively, where there is no data sharing among the partitions at the nodes. The processing nodes are also referred to herein as data nodes. The processing entities in each node manage and process their portion of the data. However, these processing entities may communicate with one another to exchange necessary information during execution. For each client connection, the system creates an agent process or thread responsible for user transaction management and query processing. This agent process or thread is called a coordinator, which may or may not reside on one of the data nodes. When a query arrives at a coordinator, the coordinator invokes a query compiler to generate a semantic tree. A query planner is then invoked to generate an optimized execution plan for the tree. The execution plan organizes the task for handling the query to the processing units (the data nodes). The results from the data nodes are returned and aggregated at the coordinator and then sent to the user.

Figure 1:
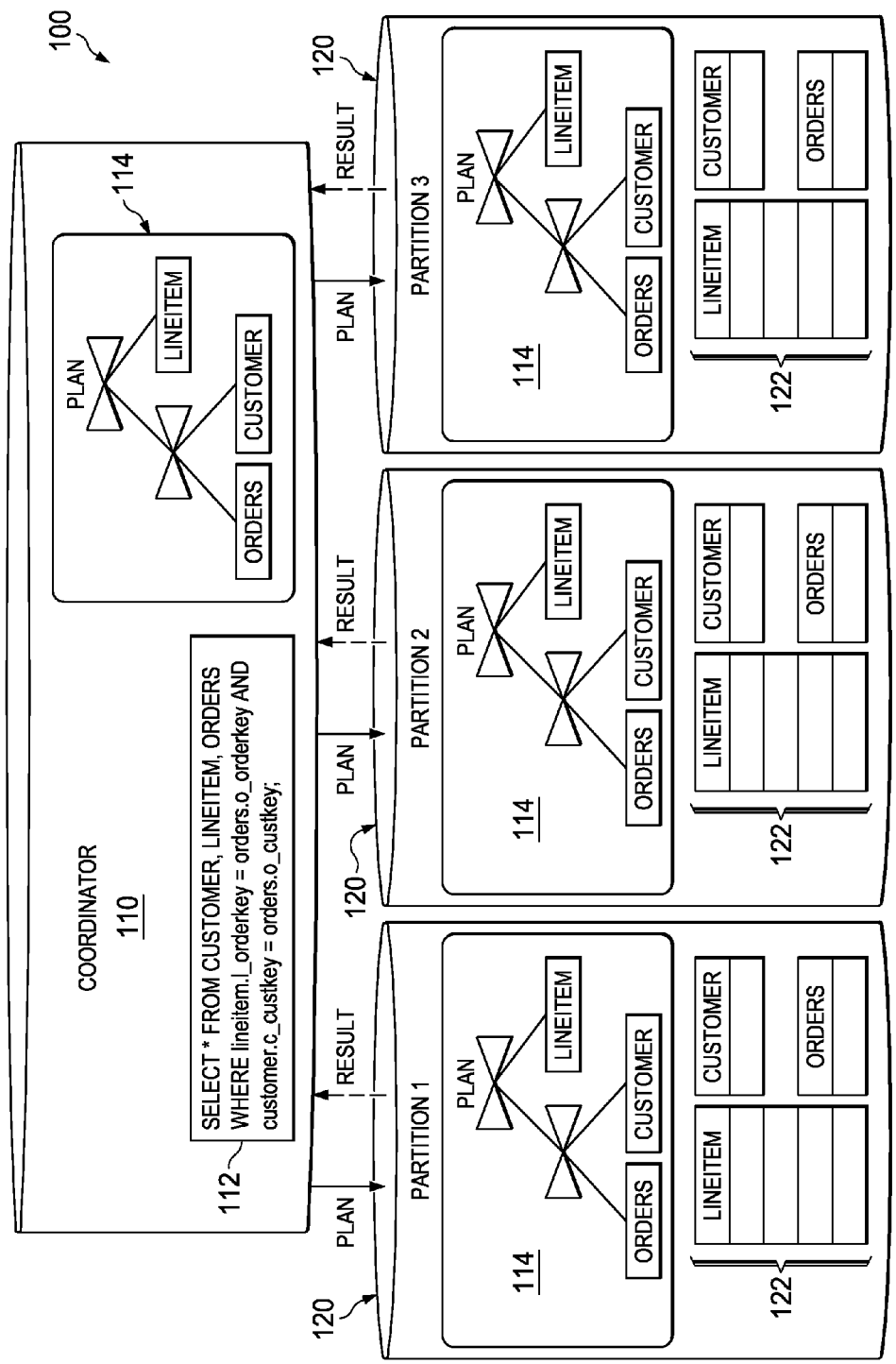
FIG. 1 illustrates a typical MPP database system.

FIG. 1 shows a typical MPP database system 100 for processing SQL join queries. In the MPP database system 100, a client application connects to the database through a coordinator 110, which is an agent process or application (e.g., a program). The coordinator 110 is connected to multiple data nodes 120 in the system. Each data node 120 can have an exclusive access to a partition of data tables 122 in the database. The coordinator 110 processes a SQL join query 112 for the client using parallel processing at the data nodes 120 and returns an aggregated result from the data nodes 120 to the client. Each data node 120 processes a plan 114 for the query 112, which is pushed down from the coordinator 110, on different exclusive partitions of the data tables 122 without common partition data. However, the data nodes 120 can still exchange table data (e.g., rows) between each other during the join query processing.

Figure 2:
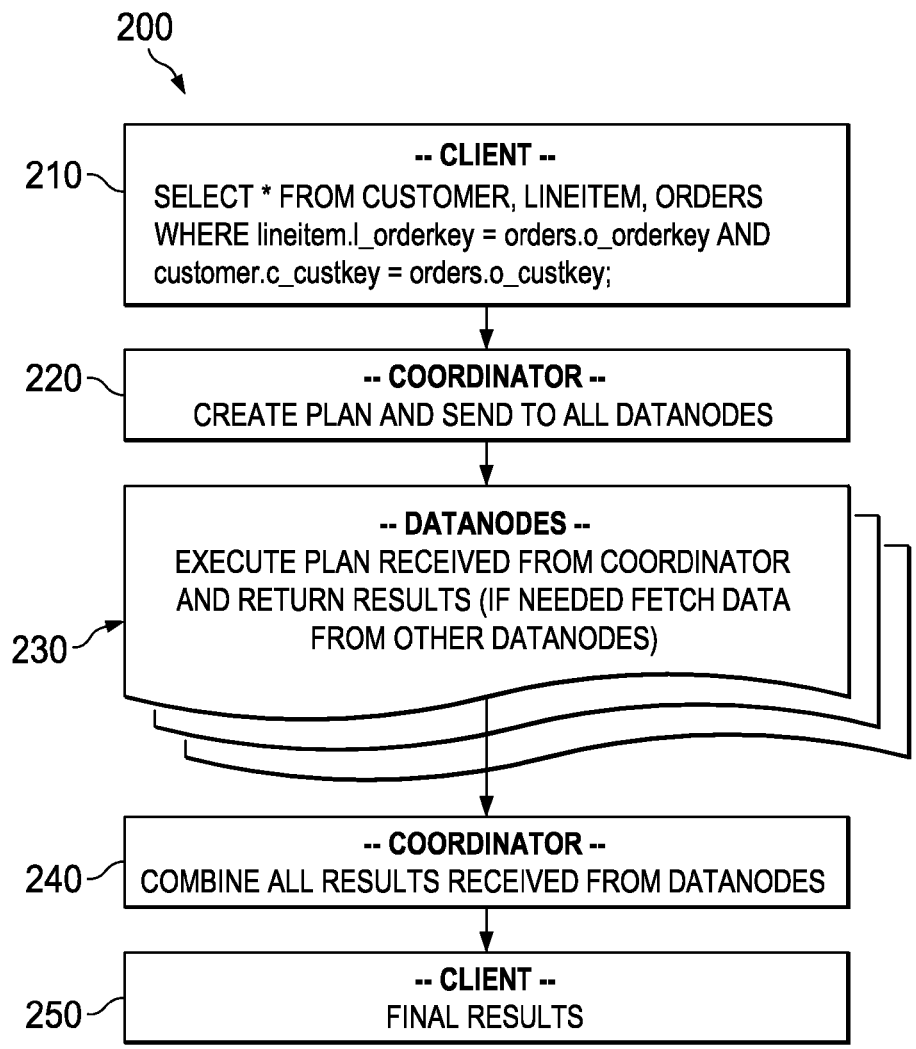
FIG. 2 is a query execution flow of a typical MPP database system.

FIG. 2 shows a query execution flow 200 of the MPP database system 100. At step 210, the coordinator 110 receives a query from a client. For example, the coordinator 110 receives the SQL query: "select * from customer, lineitem, orders where lineitem.l_orderkey=orders.o_orderkey AND customer.c_custkey=orders.o_custkey." At step 220, the coordinator 110 compiles the query to generate a query execution plan, and sends the query plan to the data nodes 120. At step 230, each data node 120 executes the plan, exchanges data with other nodes when necessary, and computes a result for the query by operating on a plurality of data tables associated with the query (e.g., lineitem, orders, and customer). Each data node 120 then returns the result to the coordinator 110. At step 240, the coordinator 110 gathers results from the data nodes 120 and combines the results. The coordinator 110 may remove some redundant results from different data nodes 120. At step 250, the coordinator 110 returns the query result to the client.

In the MPP database system 100 and the query execution flow 200, data (e.g., rows) from all tables needed for processing the join query (e.g., the tables lineitem, customer, and orders) are forwarded between the data nodes 120. The table partitions are distributed among the data nodes, but other data needed in other partitions is also accessible (e.g., via data transfer) by the different data nodes without restriction. This can cause substantial overload of resources for data transfer and processing and result in unnecessary duplicate or redundant results from different data nodes, which may reduce performance (e.g., in processing speed).

System and method embodiments are provided for improving the performance of query processing in a MPP database system. The embodiments include pushing down join query processing to data nodes recursively. Each data node receives the join query and an execution plan from a coordinator. The execution plan is a tree comprising a hierarchy of join operators, each starting a sub-tree in the plan. Each data node forwards a next join operator sub-tree in the plan to the other data nodes, where the sub-tree can be executed and the results returned to the forwarding node. This is repeated until the last join operator sub-tree in each data node is executed. While executing a join operator sub-tree, a data node can request data needed to complete the process from one or more other data nodes. Table data (e.g., rows) may only be shuffled between the data nodes if requested and necessary for such processing. Any remaining data may be restricted from sharing between the data nodes. This allows each data node to execute the join query plan in parallel and complete the job much faster.

Each data node starts executing the plan by invoking the first join operator at the top of the plan tree. The join operator can have other join operators beneath it in the plan tree or hierarchy. If and when a next join operator is encountered, the entire sub-tree beginning with that join operator is sent to all the other data nodes and executed recursively. This means, that each data node that receives a join operator sub-tree from another data node implements the same process of forwarding to other data nodes a sub-tree when encountering a next join operator in the received join operator sub-tree. When there are no more join operators, the plan tree processing is completed. The data node that is executing any join operator or join tree may only receive data that is need for this processing.

The system and method above have advantages over other MPP database systems. The recursive plan tree execution model is relatively simple yet efficient to execute deeper plan trees. This method also avoids transferring between data nodes data that is not needed by the requesting data node, which can save resources and reduce the number of unnecessary redundant results that are returned to the coordinator. Further, the join processing is recursively pushed down to individual data nodes, which exploits the computing resources available on each data node.

Figure 3:
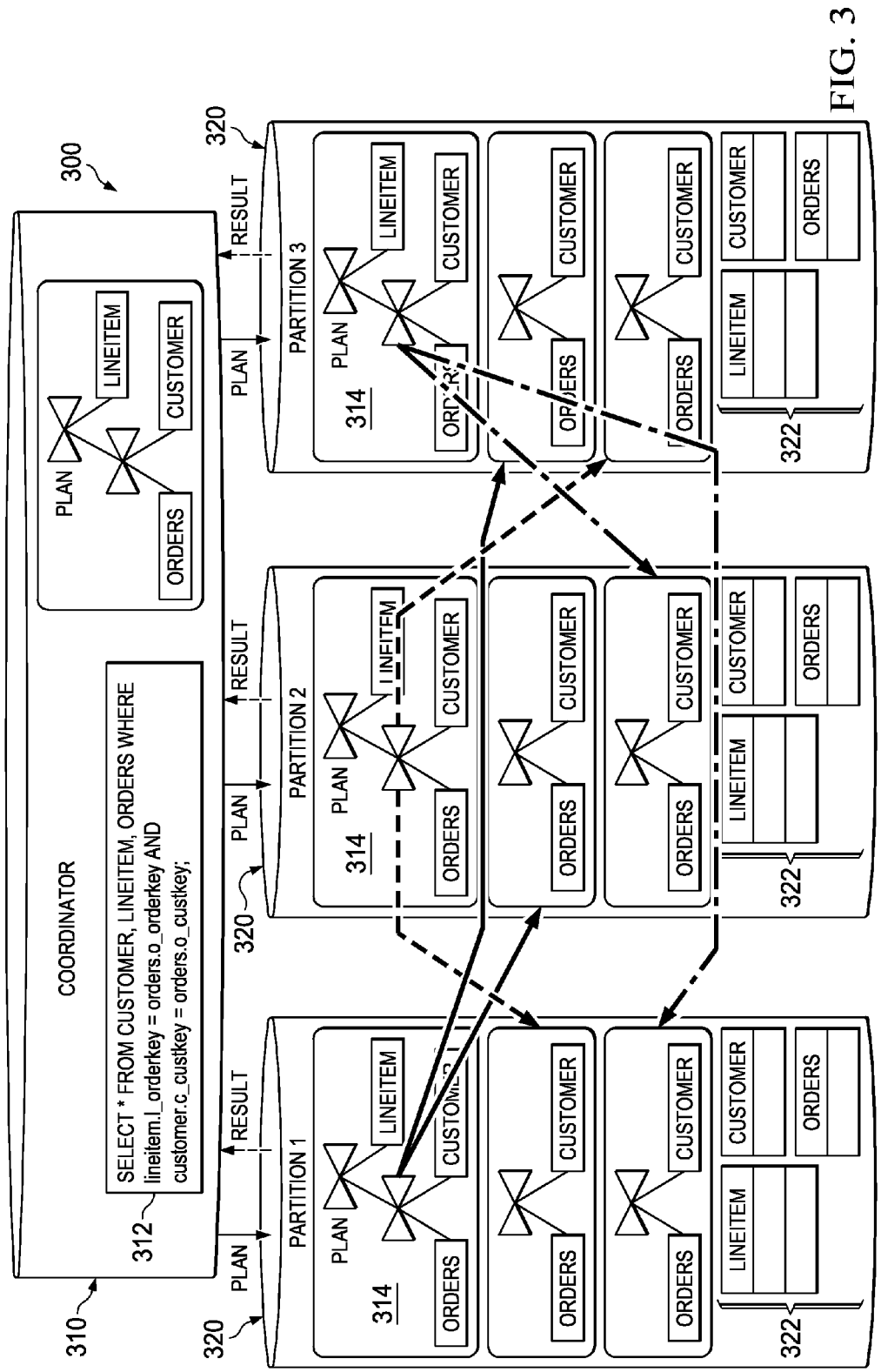
FIG. 3 illustrates an embodiment of a MPP database system with self-directed data streams.

FIG. 3 shows an embodiment of a MPP database system 300 with self-directed data streams at the data nodes for processing a SQL join query. The self-directed data streams correspond to sending the join operator sub-tree in the plan tree for recursive processing back and forth between the data nodes. In the MPP database system 300, a client application connects to the database through a coordinator 310. The coordinator 310 is connected to multiple data nodes 320 in the system. Each data node 320 can have an exclusive access to a partition of data tables 322 in the database. The coordinator 310 processes a SQL join query 312 for the client using parallel processing at the data nodes 320 and returns an aggregated result from the data nodes 320 to the client. Each data node 320 processes a plan 314 for the query 312, which is sent from the coordinator 310, on different exclusive partitions of the data tables 322 without common partition data. The processing includes executing the plan tree recursively among the data nodes 320 as described above.

As shown in FIG. 3, a data node 320 can receive a join operator sub-tree from more than one data node 320 (e.g., from the other two data nodes 320 in FIG. 3). During the execution of the join operator sub-tree, the data node 320 may encounter a next join operator in the received sub-tree and thus send a new join operator sub-tree to the other data nodes 320 (not shown). After sending a join operator sub-tree to the other data nodes 320, the forwarding node 320 waits for the results from the other nodes 320 before returning its results for processing the join operator sub-tree. After receiving the results, the data node 320 can conclude the execution of the join operator sub-tree. During the execution of a join operator sub-tree, the data node 320 can request any needed information that is not available at the data nodes 320, e.g., that is not found in the partition table of the data node 320. The data nodes 320 may be restricted to shuffle or forward between each other only the data needed to execute the join operator sub-tree at the other data nodes 320.

Figure 4:
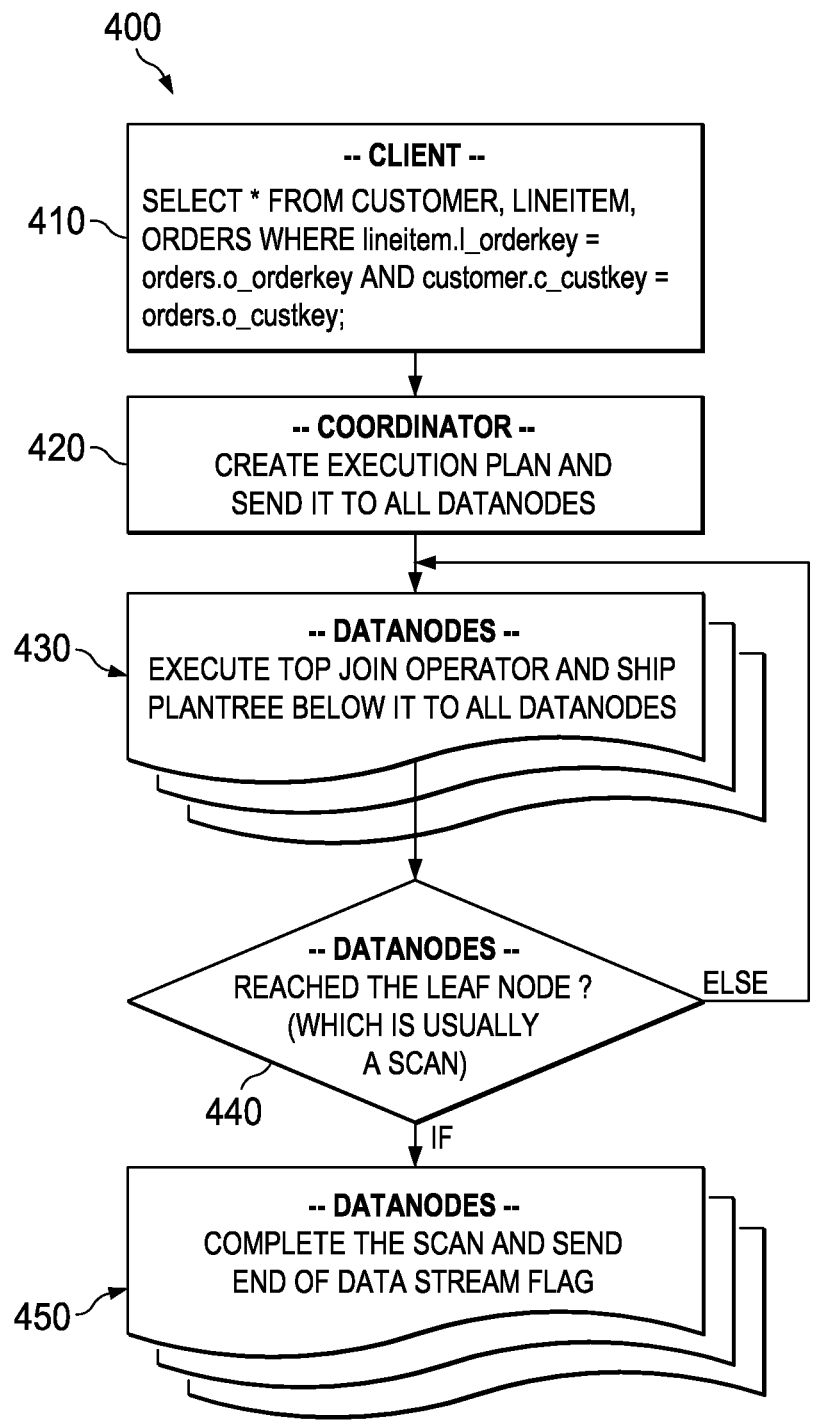
FIG. 4 is an embodiment of a query execution flow of the MPP database system with self-directed data streams.
Figure 5:
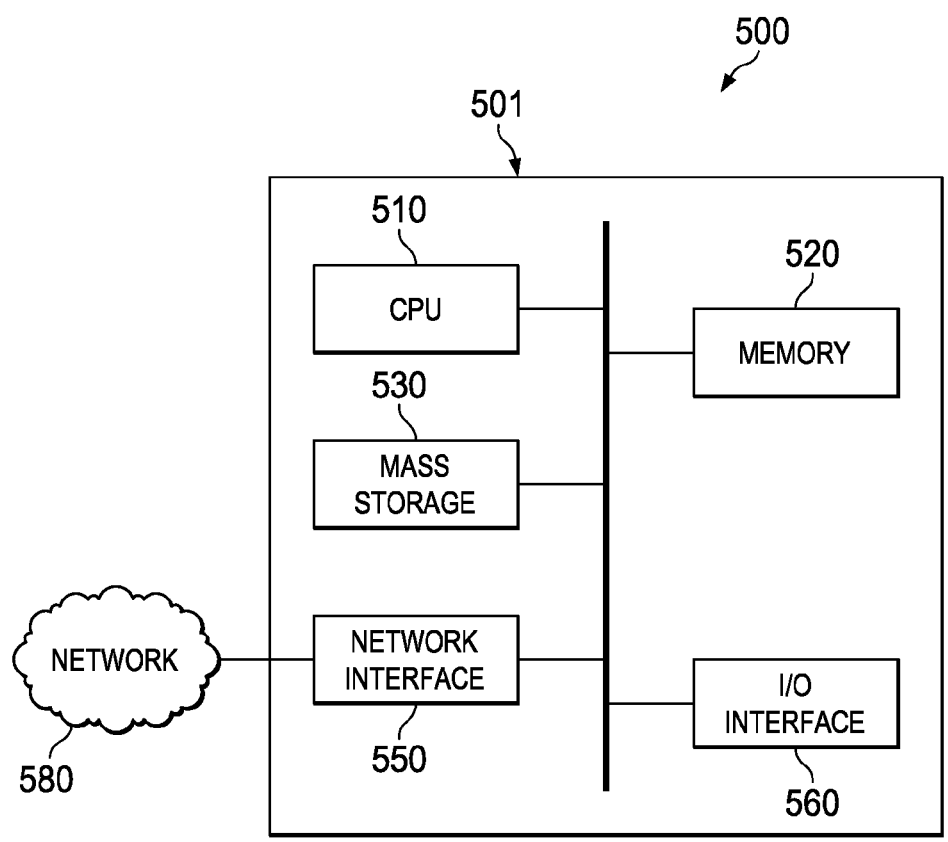
FIG. 5 is a processing system that can be used to implement various embodiments.

FIG. 4 shows an embodiment of a query execution flow 400 of the MPP database system 300 with self-directed data streams. At step 410, the coordinator 310 receives a query from a client. For example, the coordinator receives the SQL query: "select * from customer, lineitem, orders where lineitem.l_orderkey=orders.o_orderkey AND customer.c_custkey=orders.o_custkey." At step 420, the coordinator 310 compiles the query to generate a query execution plan, and sends the query plan to the data nodes 320. At step 430, each data node 320 executes a top join operator in the plan tree and sends the join operator sub-tree below it in the plan tree to all (or some of) the other data nodes 320. The data node 320 may also process the join operator sub-tree locally using its allocated table partitions. The forwarding data node 320 then receives the results of the join operator sub-tree processing from the other data nodes 320. The processing of the join operator sub-tree is done recursively at each data node 320, where any further detected sub-tree beginning with a next join operator, below the top join operator of the received join operator sub-tree, is processed locally at that data node 320 and also sent to all or some of the other data nodes 320.

At step 440, each data node 320 determines whether the last leaf node in the join operator sub-tree is reached, which is typically a scan operator or function. If the last leaf node is reached, then the processing of the operator sub-tree is completed. If this condition is true, then the method proceeds to step 450, where the data node 320 completes the scan and sends a data stream flag to the data node 320 that forwarded the join operator sub-tree. The data node 320 also sends the results back to the forwarding data node 320. Otherwise, if the condition in step 440 not true, then the method returns to step 430 to continue recursive processing of the tree or sub-tree.

As described above, during the sub-tree processing, each data node 320 uses the data in the corresponding assigned partition tables and may request other non-available data that is needed for processing from other data nodes 320. The other data nodes 320 only forward data that is needed for processing the sub-tree by the requesting node 320. Other data is not shuffled or forwarded between the data nodes 320, which restricts data transfer in the system and improves overall performance. This recursive plan tree processing accelerates processing time substantially. The processing speed is further improved for deeper plan trees.

FIG. 6 is a block diagram of a processing system 600 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a network interfaces, storage interfaces, and the like. The processing unit 601 may include a central processing unit (CPU) 610, a memory 620, a mass storage device 630, and an I/O interface 660 connected to a bus. The bus may be one or more of any type of several bus architectures including a memory bus or memory controller, a peripheral bus or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage device 630 may comprise any type of storage device configured to store data, programs, and other information and to make the data, programs, and other information accessible via the bus. The mass storage device 630 may comprise, for example, one or more of a solid state drive, hard disk drive, a magnetic disk drive, an optical disk drive, or the like.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for query processing in a shared-nothing massively parallel processing (MPP) database system, the method comprising:
receiving, at a coordinator process, a join query associated with a plurality of tables of the shared-nothing MPP database system, each of the plurality of tables being partitioned across a plurality of processing nodes of the shared-nothing MPP database system;
generating, at the coordinator process, an execution plan tree for the join query, the execution plan tree comprising a top join operator and a next join operator below the top join operator;
recursively executing, at each processing node of the plurality of processing nodes, the execution plan tree, the recursively executing comprising:
processing, at the processing node, the next join operator to obtain first sub-tree processing results, the first sub-tree processing results produced from partitions of the plurality of tables located on the processing node;
upon detecting the next join operator in the execution plan tree, forwarding, at the processing node, to the other ones of the plurality of processing nodes sub-tree for the next join operator;
receiving, at the processing node, from the other ones of the plurality of processing nodes, second sub-tree processing results produced by the other ones of the plurality of processing nodes in response to the forwarded sub-tree, the second sub-tree processing results produced from partitions of the plurality of tables located on the other ones of the plurality of processing nodes; and
processing, at the processing node, the top join operator using the first sub-tree processing results and the second sub-tree processing results to produce node query results; and
combining, at the coordinator process, the node query results from each of the processing nodes to produce aggregated result data.

2. The method of claim 1 further comprising restricting data forwarding between the processing nodes to data needed for processing the sub-tree.

3. The method of claim 2, wherein the data needed for processing the sub-tree is not available in partitions of the tables allocated to a processing node processing the sub-tree.

4. The method of claim 1 further comprising:
upon receiving the sub-tree at a processing node from the processing nodes, requesting from the other processing nodes data needed for processing the sub-tree; and
receiving the requested data upon determining that the requested data is not available in partitions of the table allocated to the processing node.

5. The method of claim 1 further comprising:
processing, at each of the processing nodes, the second sub-tree to obtain the sub-tree processing results;
upon detecting a next join operator below a top join operator in the sub-tree, forwarding, from each of the processing nodes to the other processing nodes, a second sub-tree for the next join operator; and
receiving, at each of the processing nodes from the other processing nodes, results of processing the second sub-tree.

6. The method of claim 5, wherein processing the sub-tree at each of the processing nodes includes using the results of processing the second sub-tree received from the other processing nodes.

7. The method of claim 5 further comprising:
upon reaching a leaf node in the sub-tree at each of the processing nodes, sending to the other processing nodes a flag that indicates completion of processing the sub-tree; and
returning sub-tree processing results to the other processing nodes.

8. The method of claim 1, wherein the execution plan tree indicates organized tasks for processing the join query and includes a tree comprising a hierarchy of join operators, each starting a sub-tree in the execution plan.

9. A method for query processing in a shared-nothing massively parallel processing (MPP) database system, the method comprising:
receiving, by a data node, an execution plan tree from one or more other data nodes, the execution plan tree comprising a top join operator and a next join operator below the top join operator, the execution plan tree being for a join query associated with a plurality of tables of the shared-nothing MPP database system, each of the plurality of tables of the shared-nothing MPP database system being partitioned across the data node and the one or more other data nodes;
upon detecting the next join operator in the execution plan tree, forwarding, by the data node, a first sub-tree for the next join operator to the one or more other data nodes;
receiving, by the data node from the one or more other data nodes, a second sub-tree for the next join operator;
processing, by the data node, the second sub-tree for the next join operator using partitions of the tables allocated to the data node to obtain second sub-tree processing results;
returning, by the data node, the second sub-tree processing results to the one or more other data nodes;
receiving, by the data node, first sub-tree processing results for the first sub-tree from the one or more other data nodes, the first sub-tree processing results producing using the second sub-tree processing results and partitions of the plurality of tables allocated to the one or more other data nodes; and
processing, at the data node, the execution plan tree using the first sub-tree processing results and the partitions of the plurality of tables allocated to the data node, the processing producing join query results.

10. The method of claim 9 further comprising restricting data forwarding from the one or more other data nodes to the data node to data needed for processing the sub-tree.

11. The method of claim 9 further comprising:
requesting, at the data node from the one or more other data nodes, data needed for processing the sub-tree; and
receiving the requested data upon determining that the requested data is not available in partitions of the tables allocated to the data node.

12. The method of claim 9 further comprising:
upon detecting a next join operator below a top join operator in the execution plan tree, forwarding a sub-tree for the next join operator to the one or more other data nodes; and
receiving sub-tree processing results from the one or more other data nodes.

13. The method of claim 12 further comprising:
receiving, from the one or more other data nodes, a request for data needed for processing the sub-tree; and
sending the requested data to the one or more other data nodes upon determining that the requested data is not available in partitions of the tables allocated to the one or more other data nodes.

14. The method of claim 12, further comprising returning to a coordinator process the join query results including the first sub-tree processing results.

15. The method of claim 9, upon reaching a leaf node in the second sub-tree at the data node, sending to the one or more other data nodes a flag that indicates completion of processing the sub-tree.

16. An apparatus for query processing in a shared-nothing massively parallel processing (MPP) database system, the apparatus comprising:
a data node comprising a processor; and
a computer readable storage medium coupled to the processor and storing programming for execution by the processor, the programming including instructions to:
receive, from a coordinator process that runs on the shared-nothing MPP, an execution plan tree for a join query associated with a plurality of tables of the shared-nothing MPP database system, the execution plan tree comprising a top join operator and a next join operator below the top join operator, each of the plurality of tables being partitioned across the data node and other data nodes in the shared-nothing MPP database system;
forward a sub-tree for the next join operator to the other data nodes;
receive sub-tree processing results from the other data nodes in response to the forwarded sub-tree, the sub-tree processing results produced by the other data nodes using partitions of the tables allocated to the other data nodes without using partitions of the tables allocated to the data node; and
process the top join operator to obtain top tree processing results using the sub-tree processing results from the other data nodes, and partitions of the tables allocated to the data node without using partitions of the tables allocated to the other data nodes.

17. The apparatus of claim 16, wherein the programming includes further instructions to:
receive, at the data node from the other data nodes, a sub-tree for a next join operator below a top join operator in the execution plan tree;
process the sub-tree using partitions of the tables allocated to the data node; and
return sub-tree processing results to the other data nodes.

18. The apparatus of claim 17, wherein the programming includes further instructions to:
request, at the data node from the other data nodes, data needed for processing the sub-tree; and receive the requested data upon determining that the requested data is not available in partitions of the tables allocated to the data node.

19. The apparatus of claim 17, wherein the programming includes further instructions to:
upon detecting a next join operator below a top join operator in the sub-tree, forwarding to the other data nodes a second sub-tree for the next join operator; and
receive from the other data nodes results of processing the second sub-tree.

20. The apparatus of claim 17, wherein the programming includes further instructions to, upon reaching a leaf node in the execution plan tree at the data node, send to the other data nodes a flag that indicates completion of processing the sub-tree.

* * * * *